US008578377B2

(12) United States Patent
Ge et al.

(10) Patent No.: US 8,578,377 B2
(45) Date of Patent: Nov. 5, 2013

(54) ACCELERATOR AND ITS METHOD FOR REALIZING SUPPORTING VIRTUAL MACHINE MIGRATION

(75) Inventors: Yi Ge, Beijing (CN); Rui Hou, Beijing (CN); Wu Yu Hui, Beijing (CN); Liang Liu, Beijing (CN); Wei Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 13/165,926

(22) Filed: Jun. 22, 2011

(65) Prior Publication Data
US 2012/0005678 A1 Jan. 5, 2012

(30) Foreign Application Priority Data
Jun. 30, 2010 (CN) .......................... 2010 1 0216082

(51) Int. Cl.
*G06F 9/455* (2006.01)
(52) U.S. Cl.
USPC ............................................................ 718/1
(58) Field of Classification Search
None
See application file for complete search history.

(56) References Cited

U.S. PATENT DOCUMENTS

| | | | |
|---|---|---|---|
| 8,271,814 B2* | 9/2012 | Padmanabhan et al. | 713/310 |
| 8,281,013 B2* | 10/2012 | Mundkur et al. | 709/226 |
| 2004/0221285 A1* | 11/2004 | Donovan et al. | 718/1 |
| 2005/0268298 A1 | 12/2005 | Hunt | |
| 2007/0255865 A1 | 11/2007 | Gaither | |
| 2008/0201455 A1 | 8/2008 | Husain | |
| 2008/0201711 A1 | 8/2008 | Husain | |

FOREIGN PATENT DOCUMENTS

| | | |
|---|---|---|
| CN | 101398770 | 4/2009 |
| CN | 101464812 | 6/2009 |
| CN | 101739282 | 6/2010 |

OTHER PUBLICATIONS vmblog.com, "Introducing BinaryKarma . . . ," http://vmblog.com/archive/2008/03/14/introducing-binarykarma-and-their-multi-hypervisor-platform-fluidvm.aspx.
Thomasnet News, "Virtualization Solution offers multi-hypervisor support," May 28, 2008, http://news.thomasnet.com/fullstory/544802.
Vizioncore Inc, "Time to Rethink Backup and Recover . . . ," http://virtualizationresources.searchservervirtulatization.com/document;100690/abstract.htm.
Berger, S., et al., "IBM Research Report RC23879, vTPM: Virtualizing the Trusted Platform Module", Feb. 14, 2006.
Berger, S., et al. "VTPM: Virtualizing the Trusted Platform Module" IBM Research Report, IBM Research Division. Feb. 2006. (17 pages).

* cited by examiner

*Primary Examiner* — Gregory A Kessler
(74) *Attorney, Agent, or Firm* — Tutunjian & Bitetto, P.C.; Eustus D. Nelson (57) ABSTRACT

A computer-implemented method, an accelerator hardware unit, and an article of manufacture for supporting virtual machine migration. The method includes: acquiring a task request from a task queue of an accelerator hardware unit; extracting identification information of a related virtual machine from the task request; determining whether the identification information of the related virtual machine matches the identification information of a virtual machine to be migrated, where the identification information of a virtual machine to be migrated is recorded in a virtual machine identification information table; and deleting the task request from the task queue if the extracted identification information matches the identification information of a virtual machine to be migrated.

14 Claims, 6 Drawing Sheets

ACCELERATOR AND ITS METHOD FOR REALIZING SUPPORTING VIRTUAL MACHINE MIGRATION

CROSS-REFERENCE TO RELATED APPLICATIONS

This application claims priority under 35 U.S.C. §119 to Chinese Patent Application No. 201010216082.5 filed Jun. 30, 2010, the entire contents of which are incorporated by reference herein.

BACKGROUND OF THE INVENTION

1. Field of the Invention

The present invention relates to an accelerator, particularly to an accelerator supporting virtual machine migration and its method for realizing the virtual machine migration.

2. Description of the Related Art

Cloud computing is a new Internet-based computing manner, and provides on-demand computing for individual and enterprise users through heterogeneous and autonomic services on the Internet. Cloud computing is usually considered to include the following levels of services: Infrastructure as a Service (IaaS), Platform as a service (PaaS) and Software as a Service (SaaS). The virtualization technology is an important and fundamental technology in "cloud computing" technology, and since it has the capabilities of on-demand configuration and dynamic migration, it becomes a key for realizing dynamic and scalable extension of cloud computing. In order to realize the high flexibility of the cloud computing to satisfy policies and requirements of services or management, dynamic migration and aggregation of virtual machines among physical machines need to be performed frequently, so as to achieve the objectives of reducing energy consumption, improving resource utilization and lowering management costs, etc.

However, virtual machine migration is a high I/O sensitive process. During the process where the virtual machine is migrated, since the services or applications thereon are still in operation, this will produce unexpected influence on the migration of the virtual machine. And, currently virtual machines usually perform service-related logic operations and IO operations using the accelerator on the physical machine, in which case, the problem becomes more severe and challenging, since only after the accelerator has processed the current task request in the task queue can the virtual machine be migrated; while the time for the accelerator to finish processing the request is uncertain, making the time for the virtual machine to be migrated become more uncertain. And, a long time of wait makes new requests of the user unable to be processed, which greatly reduces quality of services for the user.

Therefore, in the case that the physical machine provides an accelerator application and support, how to improve the efficiency and performance of the virtual machine migration is of vital importance and value to realizing the elasticity of the cloud system and ensuring the quality of the cloud service.

SUMMARY OF THE INVENTION

According to an aspect of the present invention, a computer-implemented method is provided for supporting virtual machine migration by an accelerator hardware unit. The method includes: acquiring a task request from a task queue of an accelerator hardware unit; extracting identification information of a related virtual machine from the task request; determining whether the extracted identification information of the related virtual machine matches the identification information of a virtual machine to be migrated, where the identification information of the virtual machine to be migrated is recorded in a virtual machine identification information table; and deleting the task request from the task queue if the extracted identification information matches the identification information of a virtual machine to be migrated.

According to a second aspect of the present invention, an accelerator hardware unit is provided for supporting virtual machine migration. The accelerator hardware unit includes: a task queue; an acquiring module configured to acquire a task request from the task queue; an extracting module configured to extract identification information of a related virtual machine from the task request; a determining module configured to determine whether the extracted identification information of the related virtual machine matches the identification information of a virtual machine to be migrated, where the identification information of the virtual machine to be migrated is recorded in a virtual machine identification information table; and a deletion module configured to delete the task request from the task queue if the extracted identification information matches the identification information of a virtual machine to be migrated.

According to a third aspect of the present invention, a computer processor is provided for supporting virtual machine migration. The processor includes the accelerator hardware unit for supporting virtual machine migration according to the above-described aspect of the present invention.

According to a further aspect of the present invention, an article of manufacture tangibly embodying computer readable instructions, which when implemented, causes a computer system to carry out the steps of the method of the present invention.

DETAILED DESCRIPTION OF PREFERRED EMBODIMENTS

In the following, an accelerator supporting virtual machine migration and its method for supporting the virtual machine migration according to embodiments of the present invention is described by referring to the accompanying drawings, in order for the objectives and the advantages of the present invention to be better understood. The method and accelerator according to embodiments of the present invention can support rapid and efficient migration of a virtual machine, so as to eliminate migration delay caused by factors like that the wait time introduced by the accelerator is uncertain.

Figure 1:
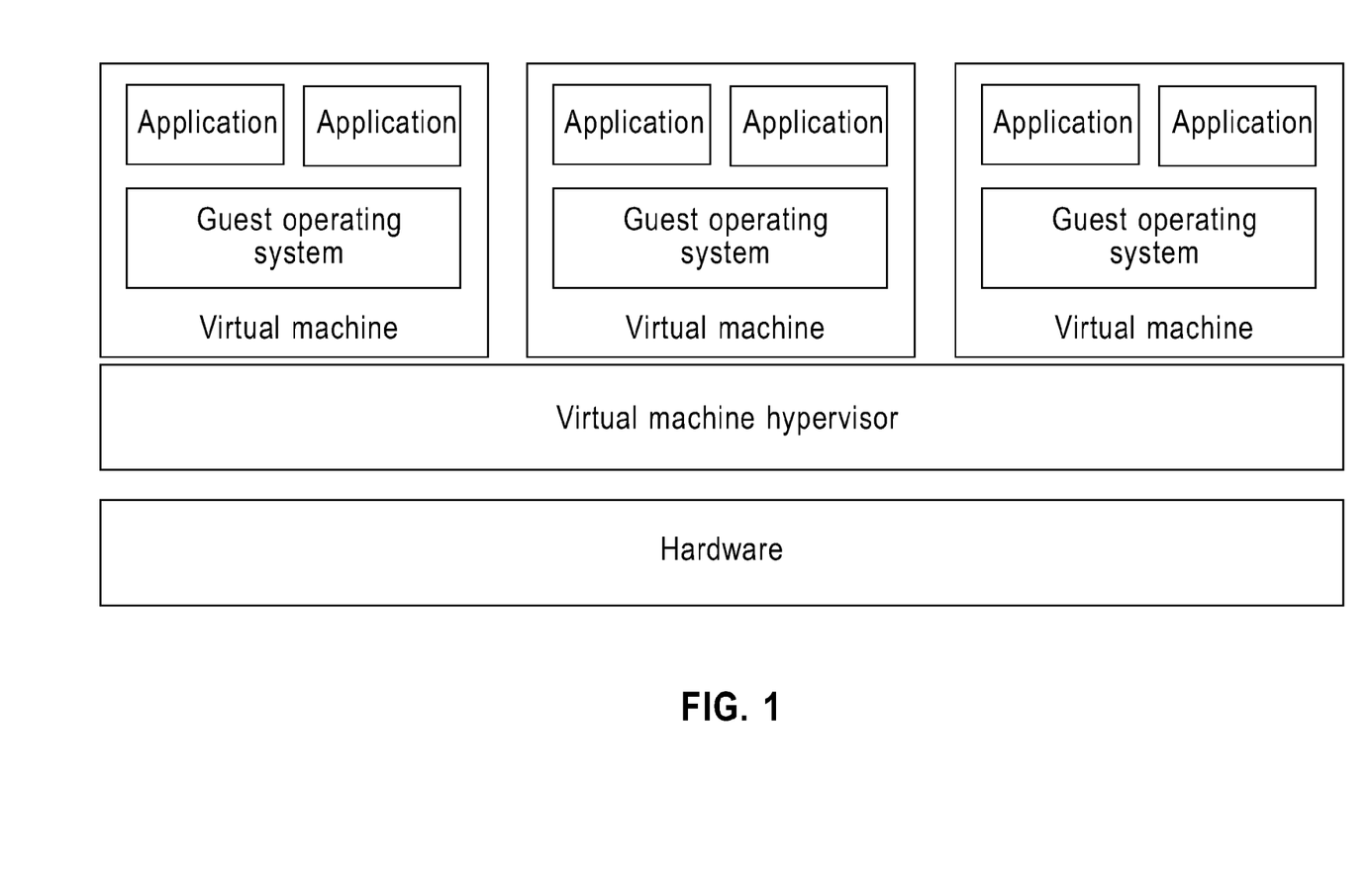
FIG. 1 shows a schematic view of a virtualization environment architecture where a plurality of virtual machines are deployed on a same physical machine according to an embodiment of the present invention.

FIG. 1 shows a schematic view of a virtualization environment architecture where a plurality of virtual machines are deployed on a same physical machine according to an embodiment of the present invention. The virtualization environment includes a physical machine, a virtual machine hypervisor and a plurality of virtual machines, where the virtual machine is a strictly isolated software container, which includes a plurality of guest operating systems (guest OSs) and a plurality of applications running on each guest OS.

A plurality of virtual machines with different operating systems can run on the same physical machine independently and in parallel, so as to realize the resource sharing of a single physical machine among a plurality of virtual machines. A virtual machine hypervisor is a software layer that provides the underlying machine virtualization. It runs on physical hardware and realizes, on the bottom layer, the management of and support to the virtual machine, to allocate hardware resources to the virtual machines in a dynamic and transparent manner. The embodiments of the present invention can operate in a virtual machine operating environment like Xen, VMware, LPAR, etc., or any kind of virtual machines independent of platforms, e.g., C#, Smalltalk, Ruby, D language, nuva.

The embodiments of the present invention are realized on a physical machine that provides the accelerating function. An accelerator is a hardware circuit unit customized for accelerating specific functions or algorithms, and has the features of high performance and high efficiency, and is usually integrated within a CPU chip. Common accelerating functions include: compression/decompression, encryption/decryption, video encoding and decoding and pattern matching, etc., and undertake important tasks of a processor core to make the processor core concentrate on other tasks like access control, system configuration and state management, so that the processor core can be freed to maximize the response speed of the system to alerts and interactions with operators.

Figure 2A:
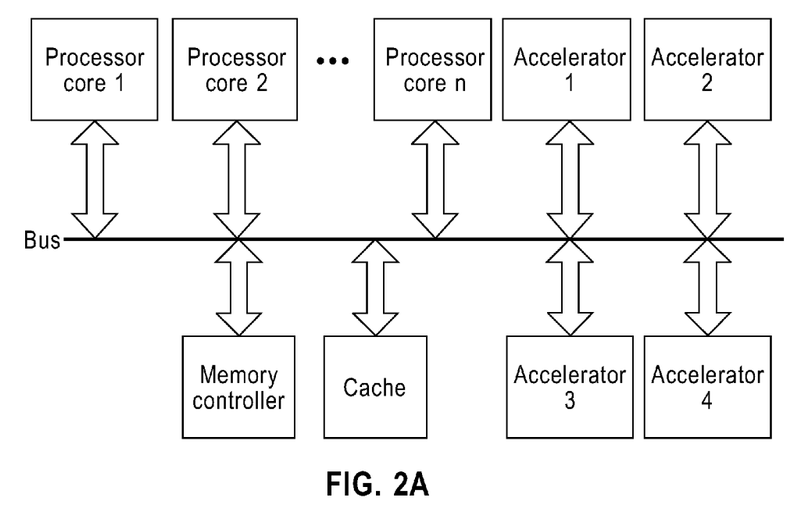
FIG. 2a shows the internal structure of a CPU chip integrated with an accelerator according to an embodiment of the present invention.
Figure 2B:
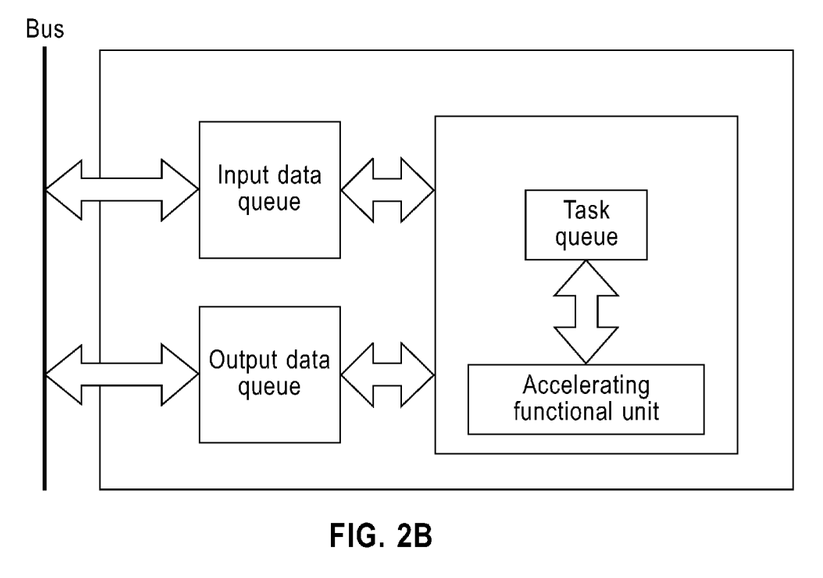
FIG. 2b shows the internal structural of an accelerator according to an embodiment of the present invention.

FIG. 2a shows the internal structure of a CPU chip integrated with an accelerator. FIG. 2b shows the internal structural of the accelerator that includes an input data queue, an output data queue, a task queue and an accelerating functional unit. The input data queue and the output data queue are connected with a bus. The input data queue receives instructions from a processor. The output data queue transmits the final calculation results realized by the accelerating functional unit to a designated memory unit. The task queue includes tasks waiting to be processed. The accelerating functional unit accomplishes the above specific accelerating functions.

Figure 3:
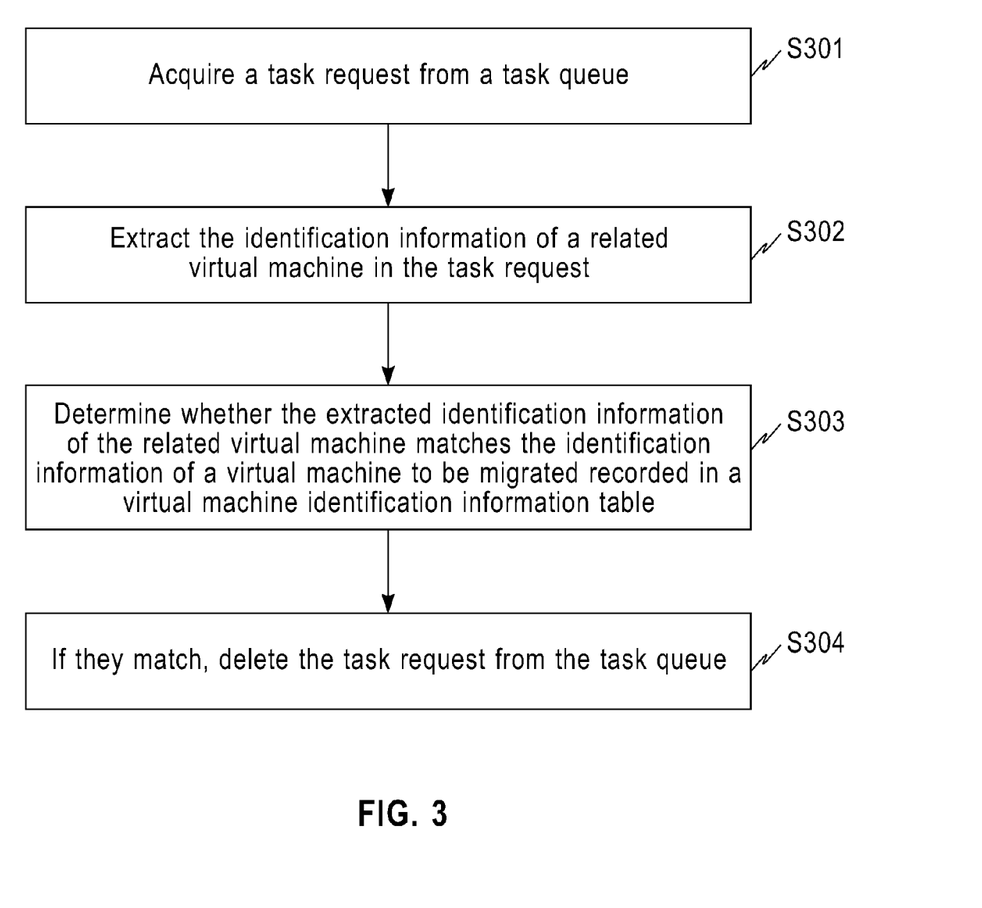
FIG. 3 shows a method for supporting virtual machine migration realized by an accelerator according to an embodiment of the present invention.

FIG. 3 shows a method for supporting virtue machine migration realized by an accelerator according to an embodiment of the present invention. The method includes: in step S301, acquiring a task request in a task queue; in step S302, extracting the identification information of a related virtual machine in the task request; in step S303, determining whether the extracted identification information of the related virtual machine matches the identification information of a virtual machine to be migrated, where the identification information of the virtual machine to be migrated is recorded in a virtual machine identification information table; and in step S304, if they match, deleting the task request from the task queue.

Figure 4:
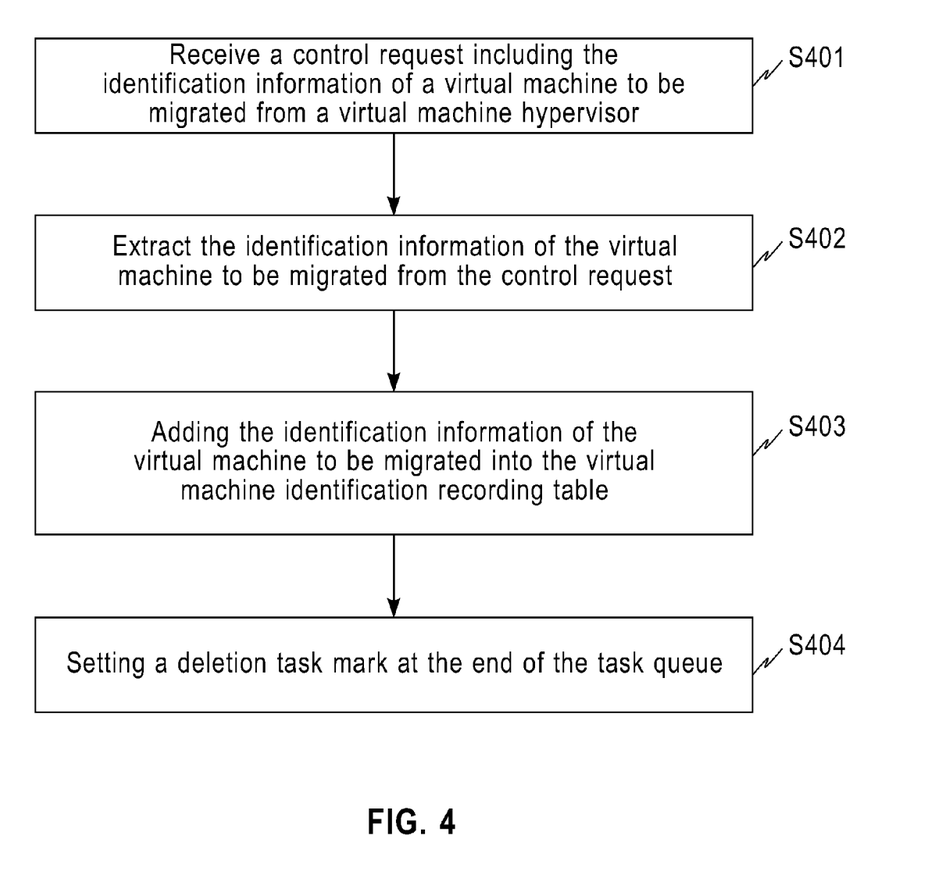
FIG. 4 shows a process of creating a virtual machine identification information table in advance according to an embodiment of the present invention.

According to another embodiment of the present invention, the method further includes a step of creating a virtual machine identification information table in advance. FIG. 4 shows a process of creating a virtual machine identification information table in advance according to the embodiment of the present invention. The method includes: in step S401, receiving, from a virtual machine hypervisor, a control request including the identification information of the virtual machine to be migrated; in step S402, extracting the identification information of the virtual machine to be migrated from the control request; in step S403, adding the extracted identification information of the virtual machine to be migrated into the virtual machine identification information table; and optionally, in step S404, setting a deletion task mark at the end the task queue to mark a task request for deleting the identification information of the virtual machine to be migrated from the virtual machine identification information table, where the deletion task mark includes the identification information of the virtual machine to be migrated.

According to still another embodiment of the present invention, steps S403 and S404 do not have definite time sequence, and S402 can be executed first, or S403 can be executed first.

According to still another embodiment of the present invention, when a virtual machine VM is ready to migrate, the virtual machine hypervisor sends a control request to all the accelerators used by the virtual machine.

Accelerator_filter_set (RA, VMID), where the semantics of the control request is as follows:

```
1: If(filter_table is not full)
2:     Set the filter ID in filter_table;
3:     if(current task has the same VMID)
4:         kill current task
5:         RA<-1
6: Else
7:     RA<-0
```

The accelerator receives the control request, extracts the identification information, VMID, of the virtual machine to be migrated from the control request and executes the control request according to the semantics of the control request; and in the case where the virtual machine identification information record table is not full, the accelerator adds the identification information of the virtual machine to be migrated into the virtual machine identification information recording table of the accelerator.

RA denotes the returned value. If the identification information of the virtual machine to be migrated is successfully added to the virtual machine identification information recording table of the accelerator, value "1" is written into the memory space pointed to by the RA address; if the addition fails, value "0" is written into the memory space pointed to by the RA address.

Thereafter, the virtual machine controller determines whether the addition is successful by reading the value written into the memory space pointed to by the RA address, where the virtual machine identification information recording table records the identification information of the virtual machines to be migrated. For example, as shown in table 1, the virtual machine identification information recording table records that the IDs of the virtual machines to be migrated are 0010 and 0011.

TABLE 1

| VMID |
|------|
| 0010 |
| 0011 |

According to another embodiment of the present invention, a deletion task mark is set at the end of the task queue to mark a task request for deleting the identification information of the virtual machine to be migrated from the virtual machine identification information table, where the deletion task mark contains the identification information of the virtual machine to be migrated. The identification information of the virtual machine to be migrated recorded in the virtual machine information table is maintained by the deletion task mark, so as to accomplish the complete lift cycle of the identification information of the virtual machine to be migrated from addition to deletion.

Since in the current virtual environment, after the virtual machine is migrated, the virtual machine identification is used repeatedly. In order to prevent a task request issued from a virtual machine with the same virtual machine identification from being erroneously considered as a task request issued from the virtual machine to be migrated due to the repeated use of the virtual machine identification, and being deleted mistakenly, and thus an error occurring, a deletion task mark is set at the end of the task queue. Since no task request will be received from the virtual machine to be migrated after the deletion task mark, it is only needed to delete all the task requests sent by the virtual machine to be migrated before the deletion task mark; and thus the deletion task mark is used as the time point for deleting the identification information of the virtual machine to be migrated.

For the case where a plurality of virtual machines need to be migrated, according to an embodiment of the present invention, deletion task mark can be set for different virtual machines respectively, and each deletion task mark contains the identification information of the corresponding virtual machine to be migrated. Here the deletion task marks are viewed as the task requests in the task queue, and have equal status to other task requests from the virtual machines, and they all contain the identification information of the virtual machines.

Figure 5:
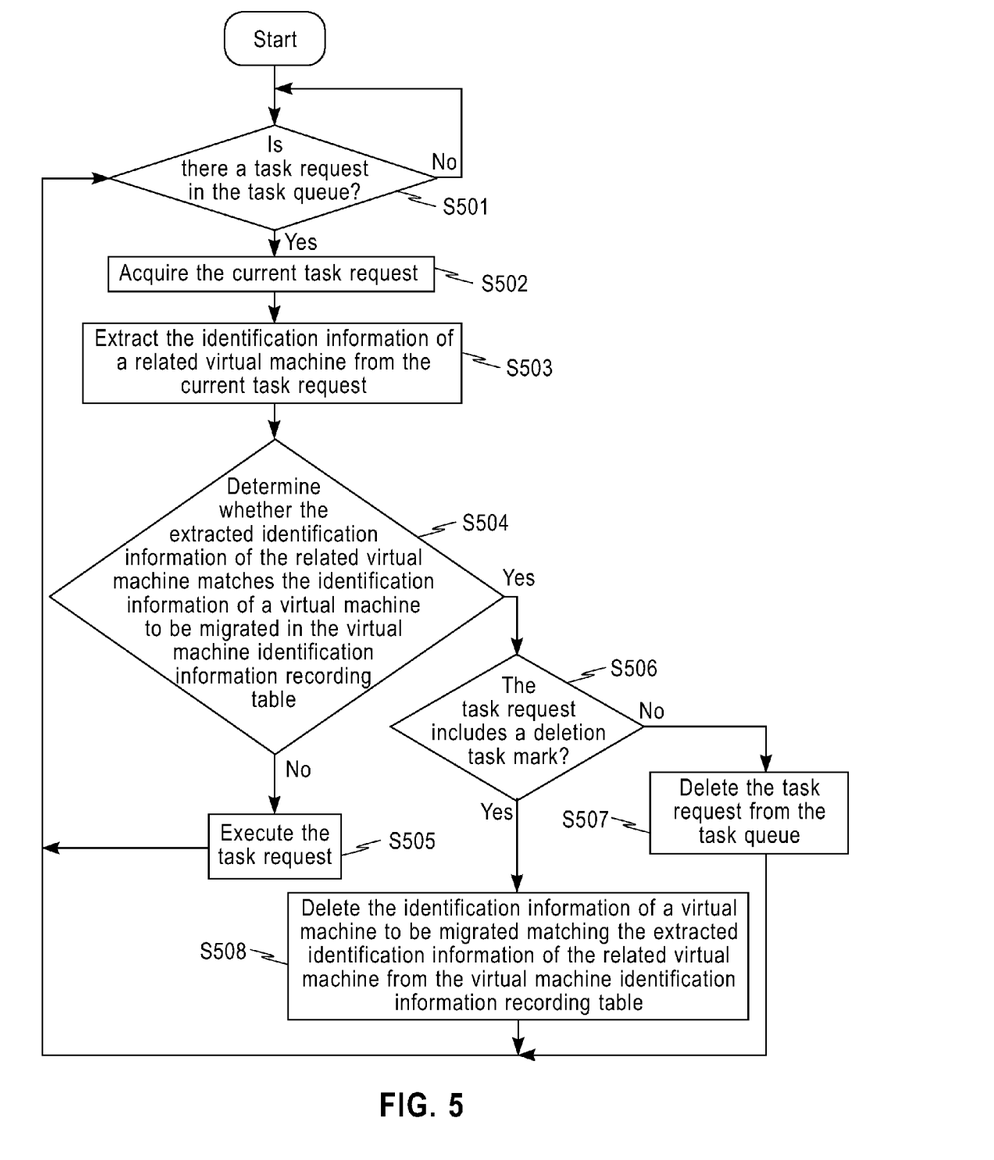
FIG. 5 shows a flow chart of a method for supporting virtual machine migration realized by an accelerator according to an embodiment of the present invention.

Specifically, FIG. 5 shows a flow chart of a method for supporting virtue machine migration realized by an accelerator according to an embodiment of the present invention. In step S501, first determine whether there is a task request in the task queue; if the determination is no, the process returns to step S501, polling to wait a task request appears in the task queue; if the determination is yes, proceed to step S502 to acquire the current task request from the task queue.

In step S503, extract the identification information of the related virtual machine from the current task request. According to an embodiment of the present invention, the identification information of the related virtual machine includes the identification information of the virtual machine where the application program issuing the task request is located. According to another embodiment of the present invention, the identification information of the related virtual machine further includes the identification information of the virtual machine related to the deletion task mark.

In step S504, determine whether the extracted identification information of the related virtual machine matches the identification information of a virtual machine to be migrated recorded in the virtual machine identification information recording table. Specifically, in response to receiving a control request issued by the virtual machine hypervisor, the matching between the extracted identification information of the related virtual machine and the identification information of the virtual machine to be migrated recorded in the virtual machine identification information recording table is realized.

According to an embodiment of the present invention, the matching between the extracted identification information of the related virtual machine and the identification information of the virtual machine to be migrated, where the identification information of the virtual machine to be migrated is recorded in the virtual machine identification information recording table, is realized by a content addressable memory (CAM). The content addressable memory is a memory that addresses based on content, and it can perform large amount of parallel searches rapidly. Its major working mechanism is to compare an input data item with all the data items stored in the CAM automatically and simultaneously, to determine whether the input data item matches a data item stored in the CAM, and output the matching information to which the data item corresponds. Those skilled in the art will appreciate that the embodiments of the present invention can be realized by the content addressable memory (CAM) with the above functions in the prior art, or can be realized by any modules with the above functions which may appear in the future.

If the determination in step S504 is yes, according to an embodiment of the present invention, delete the task request from the task queue in step S507, and return to step S501; if the determination is no, execute the task request in step S505, and then return to step S501.

Optionally, according to another embodiment of the present invention, if the determination in step S504 is yes, proceed to determine whether the task request includes a deletion task mark in step S506; if it includes a deletion task mark, delete the identification information of the virtual machine to be migrated which matches the extracted identification information of the related virtual machine in the virtual machine identification information recording table in step S508, and return to step S501. By the deletion task mark, the life cycle of the identification information of the virtual machine to be migrated in the virtual machine identification information recording table is maintained.

If the determination is no, delete the task request from the task queue in step S507 and return to step S501. Using the method according to the embodiments of the present invention, after the instruction to migrate the virtual machine is received, the accelerator can delete the task requests previously issued by the virtual machine to be migrated rapidly and correctly to support the rapid and efficient migration of the virtual machine. After the completion of the virtual machine migration, the migrated virtual machine can resend a task request to the accelerator supporting the migrated virtual machine via a mechanism like response time out, so that the accelerator of the migrated virtual machine re-processes the task request.

Compared with the current method, the virtual machine does not need to wait for the accelerator to finish processing the task request previously issued by the virtual machine to be migrated, and as long as the necessary work for the migration of the virtual machine is finished, i.e., the statuses of the memory and registers of the virtual machine to be migrated have been transmitted to the physical machine at the destination end, the migration process is accomplished, so that the migration delay caused by factor of uncertain wait time introduced by the accelerator is eliminated.

Figure 6:
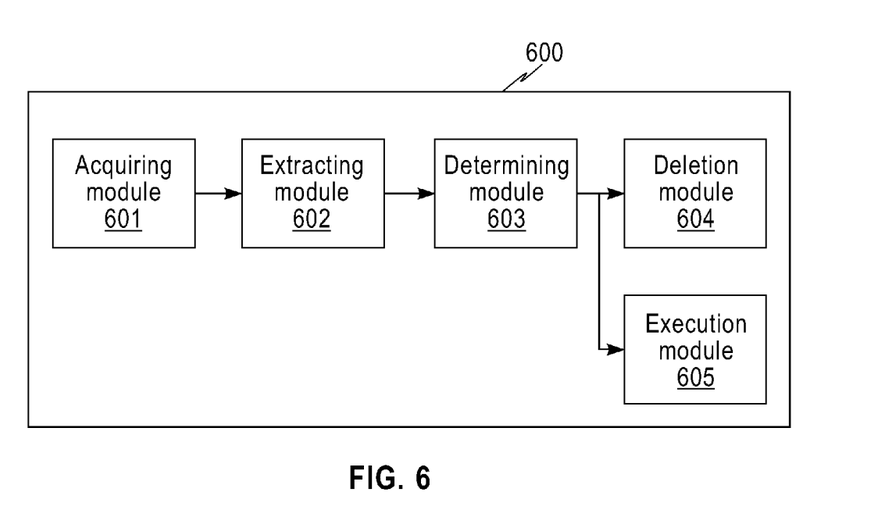
FIG. 6 shows a block diagram of an accelerator for realizing supporting virtual machine migration according to an embodiment of the present invention.

Based on the same inventive concept, the embodiments of the present invention provide an accelerator for realizing supporting virtual machine migration. FIG. 6 shows a block diagram of an accelerator for realizing supporting virtue machine migration according to an embodiment of the present invention. The accelerator includes: an acquisition module 601 configured to acquire a task request in a task queue; an extraction module 602 configured to extract the identification information of a related virtual machine from the task request; a determining module 603 configured to determine whether the extracted identification information of the related virtual machine matches the identification information of a virtual machine to be migrated recorded in the virtual machine identification information table; and a deletion module 604 configured to delete the task request from the task queue if they match. According to another embodiment of the present invention, the accelerator further includes an execution module 605 configured to execute the task request if the extracted identification information of the related virtual machine does not match the identification information of a virtual machine to be migrated recorded in the virtual machine identification information table.

According to an embodiment of the present invention, the accelerator further includes a virtual machine identification information creating module configured to create a virtual machine identification information table in advance, where the virtual machine identification information table creating module is further configured to: receive a control request containing the identification information of a virtual machine to be migrated from a virtual machine hypervisor; extract the identification information of the virtual machine to be migrated from the control request; and add the extracted identification information of the virtual machine to be migrated into the virtual machine identification information table.

Optionally, the virtual machine identification table creating module is further configured to: set a deletion task mark at the end of the task queue, where the deletion task mark contains the identification information of the virtual machine to be migrated. In this case, according to an embodiment of the present invention, if the determination is yes, deleting the task request from the task queue further includes: if the determination is yes, determine whether the task request includes the deletion task mark; if the task request includes the deletion task mark, delete the identification information of the virtual machine to be migrated from the virtual machine identification information table; if the task request does not include the deletion task mark, delete the task request from the task queue.

According to an embodiment of the present invention, the identification information of the related virtual machine includes the identification information of the virtual machine where the application issuing the task request is located. According to another embodiment of the present invention, the identification information of the related virtual machine further includes the identification information of the virtual machine related to the deletion task mark.

Figure 7:
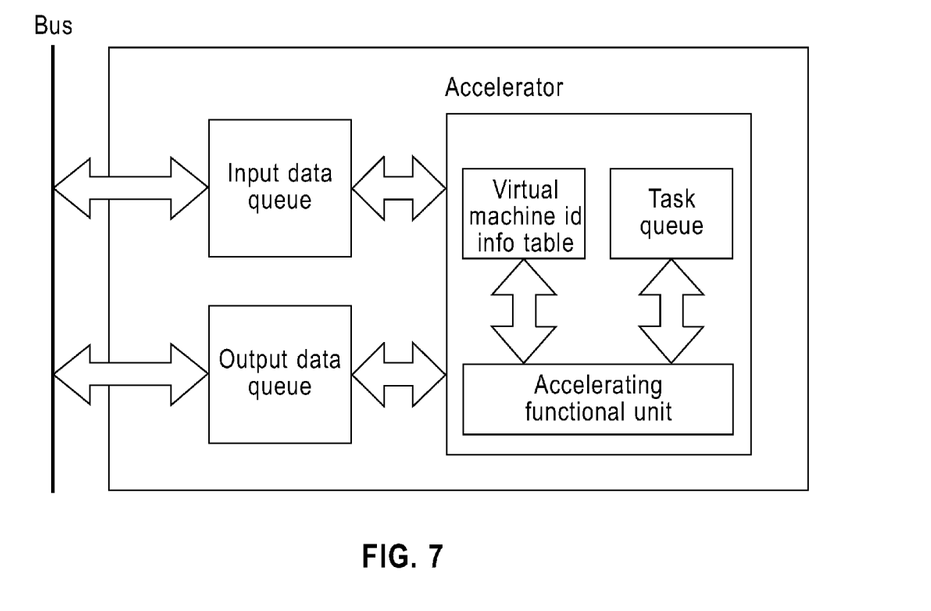
FIG. 7 shows a hardware structure of an accelerator for realizing supporting virtual machine migration according to an embodiment of the present invention.

The present invention provides an accelerator for realizing supporting virtual machine migration. FIG. 7 shows the hardware structure of an accelerator for realizing supporting the virtue machine migration according to an embodiment of the present invention. Compared with accelerators in the prior art, it has a virtual machine identification information table added in hardware, as well as corresponding functional logics, which are: acquiring a task request in a task queue; extracting the identification information of a related virtual machine in the task request; determining whether the extracted identification information of the related virtual machine matches the identification information of the virtual machine to be migrated recorded in the virtual machine identification information table; and if they match, delete the task request from the task queue. The functional logics can be realized by a content addressable memory (CAM) in the prior art. The functional logics further include: executing the task request if the determination is no. The functional logics further include creating a virtual machine identification information table in advance; where creating a virtual machine identification information table in advance includes: receiving a control request containing the identification information of a virtual machine to be migrated from a virtual machine hypervisor; extracting the identification information of the virtual machine to be migrated from the control request; and adding the extracted identification information of the virtual machine to be migrated into the virtual machine identification information table.

Optionally, a functional logic further include: setting a deletion task mark for deleting the identification information of the virtual machine to be migrated from the virtual machine identification information table at the end of the task queue, where the deletion task mark includes the identification information of the virtual machine to be migrated. In this case, according to an embodiment of the present invention, if the determination is yes, deleting the task request from the task queue further includes: if the determination is yes, determine whether the task request includes the deletion task mark; if the task request includes the deletion task mark, delete the identification information of the virtual machine to be migrated from the virtual machine identification information table; if the task mark does not include the deletion task mark, delete the task request from the task queue.

The present invention further provides a processor supporting the migration of virtual machine, and the processor has an integrated accelerator with the above described features.

It should be understood that at least some aspects of the present invention can be realized in program products alternatively. Programs defining the functions of the present invention can be transmitted to a data storage system or computer system through various signal carrying medium. The signal carrying medium include, but not limited to, non-writable storage medium (e.g., CD-ROM), writable storage medium (e.g., floppy discs, hare disc drives, read/write CD ROM, optical medium) and communication medium such as computer and telephone networks including Ethernet. Therefore, it should be understood that such signal carrying medium, when the computer readable instructions carrying or encoded with the method functions in the present invention, represents an alternative embodiment of the present invention. The present invention can be realized in hardware, software, or a combination thereof. The present invention can be realized in a computer system in a centralized manner, or in a distributed manner, in which, different components are distributed in some interconnected computer system. Preferably, the present invention is realized in a combination of computer software and general computer hardware, in which, when the computer program is loaded and executed, it controls the computer system to execute the method of the present invention, or constitutes the system of the present invention.

Description of the preferred embodiments of the present invention has been presented above for the purpose of exemplary illustration. The above description of the preferred embodiments is not exhaustive, and is not intended to limit the present invention to the disclosed definite form. Obviously, in view of the above teachings, many amendments and changes are possible. The amendments and changes, which are obvious to those skilled in the art, are within the scope of the present invention defined by the appended claims.

What is claimed is:

1. A computer-implemented method for supporting virtual machine migration by an accelerator hardware unit, comprising:
    acquiring a task request from a task queue of an accelerator hardware unit;
    extracting identification information of a related virtual machine from the task request;
    determining whether the extracted identification information of the related virtual machine matches the identification information of a virtual machine to be migrated, wherein the identification information of the virtual machine to be migrated is recorded in a virtual machine identification information table;
    deleting the task request from the task queue if the extracted identification information matches the identification information of a virtual machine to be migrated; and
    executing the task request if the extracted identification information do not match the identification information of the virtual machine to be migrated.

2. The method of claim 1, further comprising creating the virtual machine identification information table.

3. The method of claim 2, wherein creating the virtual machine identification information table comprises:
    receiving, from a virtual machine hypervisor, a control request including the identification information of a virtual machine to be migrated;
    extracting the identification information of the virtual machine to be migrated from the control request; and
    adding the extracted identification information of the virtual machine to be migrated into the virtual machine identification information table.

4. The method of claim 3, wherein creating the virtual machine identification information table further comprises:
    setting a deletion task mark at the end of the task queue, wherein the deletion task mark includes the identification information of a virtual machine to be migrated.

5. The method according to claim 4, wherein deleting the task request from the task queue if the extracted identification information matches the identification information of a virtual machine to be migrated comprises:
    determining whether the task request includes a deletion task mark;
    deleting the identification information of the virtual machine to be migrated from the virtual machine identification information table if the task request includes the deletion task mark; and
    deleting the task request from the task queue if the task request does not include the deletion task mark.

6. The method according to claim 1, wherein the identification information of a related virtual machine comprises the identification information of the virtual machine where the application issuing the task request is located.

7. An accelerator hardware unit for supporting virtual machine migration, comprising:
    a task queue;
    an acquiring module configured to acquire a task request from the task queue;
    an extracting module configured to extract identification information of a related virtual machine from the task request;
    a determining module configured to determine whether the extracted identification information of the related virtual machine matches the identification information of a virtual machine to be migrated, wherein the identification information of the virtual machine to be migrated is recorded in a virtual machine identification information table;
    a deletion module configured to delete the task request from the task queue if the extracted identification information matches the identification information of a virtual machine to be migrated; and
    an executing module configured to execute the task request if the extracted identification information do not match the identification information of the virtual machine to be migrated.

8. The accelerator of claim 7, further comprising a virtual machine identification information table creating module configured to create the virtual machine identification information table.

9. The accelerator of claim 8, wherein the virtual machine identification information table creating module is further configured to:
    receive, from a virtual machine hypervisor, a control request including the identification information of a virtual machine to be migrated;
    extract the identification information of the virtual machine to be migrated from the control request; and
    add the extracted identification information of the virtual machine to be migrated into the virtual machine identification information table.

10. The accelerator of claim 9, wherein the virtual machine identification information table creating module is further configured to:
    set a deletion task mark at the end of the task queue, wherein the deletion task mark includes the identification information of a virtual machine to be migrated.

11. The accelerator of claim 10, wherein deleting the task request from the task queue if the extracted identification information matches the identification information of a virtual machine to be migrated further comprises:
    determining whether the task request includes the deletion task mark;
    deleting the identification information of the virtual machine to be migrated from the virtual machine identification information table if the task request includes the deletion task mark; and
    deleting the task request from the task queue if the task request does not include the deletion task mark.

12. The accelerator according to claim 7, wherein the identification information of a related virtual machine includes the identification information of the virtual machine where the application issuing the task request is located.

13. A computer processor for supporting virtual machine migration, comprising the accelerator hardware unit of claim 7.

14. A computer-readable storage medium comprising computer-readable instructions which when implemented causes a computer system to perform the steps of a computer-implemented method for supporting virtual machine migration by an accelerator hardware unit, the steps comprising:
    acquiring a task request from a task queue of an accelerator hardware unit;
    extracting identification information of a related virtual machine from the task request;
    determining whether the extracted identification information of the related virtual machine matches the identification information of a virtual machine to be migrated, wherein the identification information of the virtual machine to be migrated is recorded in a virtual machine identification information table;

deleting the task request from the task queue if the extracted identification information matches the identification information of a virtual machine to be migrated; and executing the task request if the extracted identification information do not match the identification information of the virtual machine to be migrated.

* * * * *